Nov. 3, 1970 W. A. HANGER 3,538,353

SWITCHING CIRCUIT

Filed Oct. 13, 1967 2 Sheets-Sheet 1

INVENTOR.
WILLIAM A. HANGER
BY [signature]
HIS ATTORNEY

INVENTOR.
WILLIAM A. HANGER
BY Stanley C Corwin
HIS ATTORNEY

United States Patent Office 3,538,353
Patented Nov. 3, 1970

3,538,353
SWITCHING CIRCUIT

William A. Hanger, Churchville, Va., assignor to General Electric Company, a corporation of New York Filed Oct. 13, 1967, Ser. No. 675,131
Int. Cl. H03k 17/66
U.S. Cl. 307—255 4 Claims

ABSTRACT OF THE DISCLOSURE

A circuit having a first portion for applying a first polarity voltage to a load and a second portion for applying a second, opposite polarity voltage to the load. Each portion includes a transistor switch which when rendered conductive in response to the change in voltage level of an input signal allows application to the load of the voltage associated with that stage. Each stage also includes a transistor connected so as to be responsive to the conduction of the transistor switch in that stage and also connected so as to prevent the turning on of the transistor switch in the other stage until the transistor switch in the former stage is nonconductive.

BACKGROUND OF THE INVENTION

Figure 1:
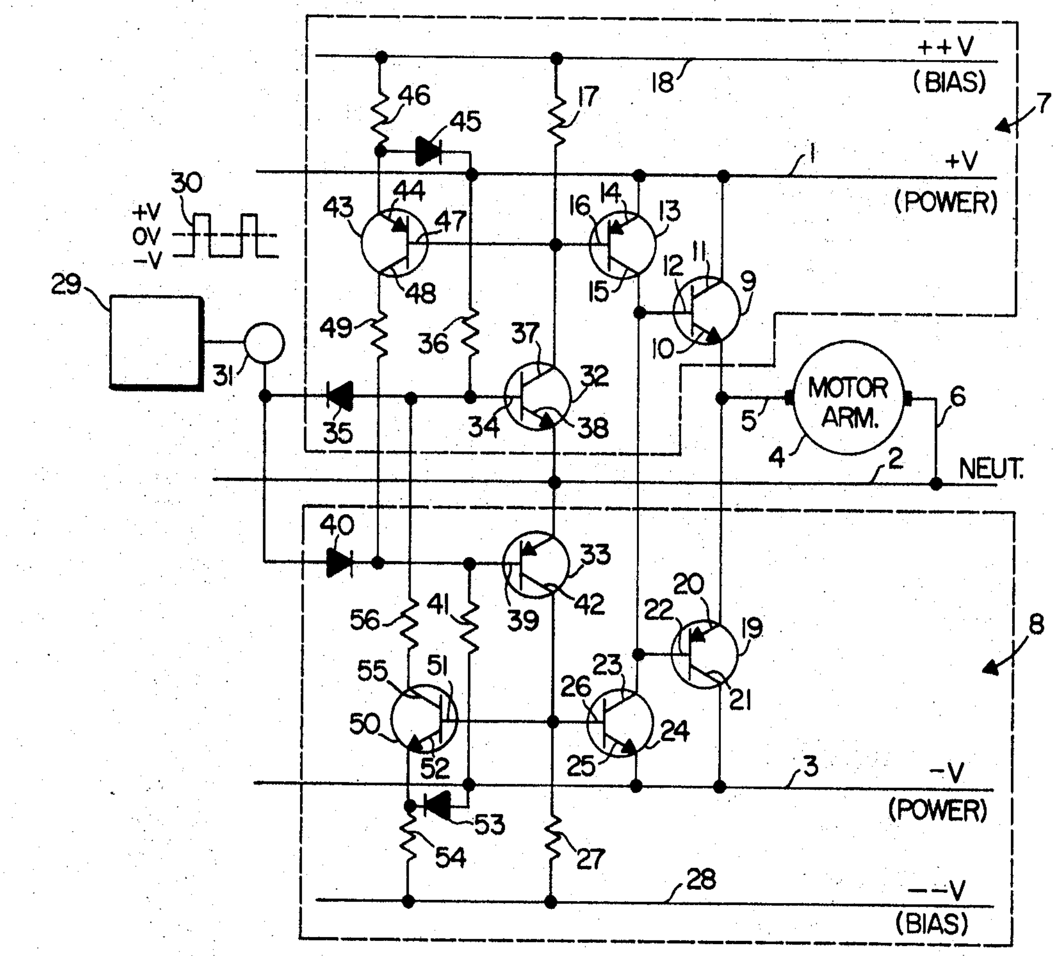

This invention relates to a circuit for selectively applying a voltage of one polarity and another voltage of the opposite polarity to a load and, more particularly to a circuit for insuring that the switching devices which apply the first polarity voltage to a load are nonconductive before the devices for applying the second polarity voltage are rendered conductive.

A circuit to which this invention is applicable would include a first portion for applying a first polarity voltage to a load and a portion for applying a second opposite polarity voltage to that same load. Each portion would include a semiconductor switching means such as a power transistor for applying the polarity voltage associated with that portion to the load. Each of the semiconductor switching means or power transistors would be activated or turned on by the operation of additional components included within each portion of the circuit. The nature of the load would be such that it is desired that only one of the two circuit portions apply its associated voltage to the load at any given instant of time. This, in turn, would require that only one of the semiconductor switching means be conducting at any given instant of time. Such a load, for example, could be a DC motor in a servo system wherein the direction of rotation of the motor would be determined by the polarity of voltage applied to it.

During the switching transition, that is, the interval of time during which the previously conducting semiconductor switching means or power transistor in one portion is turned off and the previously nonconducting semiconductor switching means or power transistor in the other portion is turned on, both switching means may be in the conducting state for a portion of that interval. If, as in some circuits of this type, a common connection is provided between both switching means, this results in an undesirable flow of current through both of the switching means rather than through only one of the switching means to the load during that portion of the interval. Such a current flow is undesirable because it can cause excessive heat generation in both of the semiconductor switching means or power transistors which can result in their destruction. One reason for both semiconductor switching means remaining in the conductive state during a portion of the switching transition is evident upon a considertaion of the transient response characteristics of transistors. It is known that the turn-off time delay of a transistor is greater than the turn-on time delay, the difference arising from such factors as the diffusion time of the carriers across the base region, the capacitances between leads, and the operating conditions of the circuit in which the transistor is used. It is evident, then, that when two transistors are used in a cooperative switching arrangement, both can be in a conductive state during a switching transition because one transistor will require more time to turn off than the other transistor will require to turn on. Without some means for preventing the turn-on of the one power transistor until the other power transistor is completely turned off, an undesirable current can flow through both of them during a switching transition.

One possible solution would be to include within the circuit components which would provide a fixed time delay between the time that one stage of the circuit is initially biased off and the other stage of the circuit is turned on. Such a scheme, however, has serious practical limitations in that the delay time would have to be adjusted for the particular circuit parameters at a given temperature. The delay time would also have to be fixed so as to be as long as the delay time of the slowest-acting transistor in the circuit. Such a worst case design, however, might penalize the other cases. An additional limitation of the delay-time approach is that the delay circuit would have to be reset during the period in which either of the stages is conducting. In a high-speed servo system, switching may be required before the delay circuit has become sufficiently reset and, as a result, the critical delay time at the next and subsequent transitions may be foreshortened. A preferred solution to this problem would incorporate an actual case sensing of the conduction of the devices in each stage of the circuit, or more specifically, a feedback of actual operating conditions rather than just an allowance for worst case conditions.

Prior art actual case sensing schemes have been incorporated in two-portion circuits wherein each portion includes a controlled rectifier, such as a silicon controlled rectifier, and a means for firing that rectifier, such as a unijunction transistor. A load is connected at a point between the cathode of one rectifier and the anode of the other, and the voltage at this mid-point is what is actualy sensed. Specifically, when the controlled rectifier of the first portion is conducting, the voltage at the mid-point is of such magnitude and polarity that when fed back and applied to the base of the unijunction transistor included within the second portion of the circuit, it biases off that transistor so as to maintain the controlled rectifier in the second portion nonconducting. When the controlled rectifier included within the first portion is turned off by separate commutating means, the voltage at the mid-point changes in magnitude so as to no longer bias off the unijunction transistor included within the second portion. That transistor may then be turned on so as to render conducting the controlled rectifier in the second portion. The first portion controlled rectifier is maintained nonconducting by a similar feedback arrangement.

The prior art thus shows the feedback of the voltage at a point between the two semiconductor switching means, which point is also connected to the load, to provide an indication of the actual operating conditions, i.e., the conducting state, of each of the semiconductor switching means. Such an arrangement, however, would not provide an accurate indication if the load were a motor since the motor may have a counter E.M.F. when both of the switching means are conducting or nonconducting. To provide an accurate indication, therefore, it would be desirable to have included within each portion of the circuit means connected to the switching means within that stage for sensing the actual conduction of the switching means and for controlling the conduction of the switching means included within the other portion.

It is accordingly an object of this invention to provide, in a two-portion circuit for selectively applying first and second polarity voltages to a load, an accurate indication of the conduction of switching means included within each portion which indication will be uninfluenced by the electrical characteristics of the load, and, additionally, to uitilize this indication to prevent the conduction of the switching means in one portion until the switching means in the other portion is nonconducting.

Another object of the invention is to provide, in a circuit for alternately applying opposite polarity voltages to a load through first and second switches, means for sensing the state of conduction of the switches and permitting one to conduct only after the other has ceased to conduct.

It is possible to achieve the above-stated objects by sensing the current being supplied to the load by the transistor switches in each circuit portion. The disadvantages of such sensing, however, are twofold. First, an additional sensing element such as a resistor or current transformer is required. Second, if the sensor is placed in the emitter circuit, the transient turn-off period of storage and fall occasioned by the capacitance of the emitter-base junction will not be detected and an absolute indication of transistor nonconduction is not obtained.

It is accordingly an object of the invention to provide an inexpensive inhibit circuit for a push-pull transistor power switching circuit where sensing of the state of conduction of the transistors is done at the emitter-base junction of the respective transistors.

Another object of the invention is to provide an inhibit circuit for a push-pull transistor power switching circuit which obtains an absolute indication of conduction by sensing the emitter-base junction of each transistor to inhibit the nonconducting transistor from turning on until the conducting transistor is absolutely off.

A further object of the invention is to provide an AND gate inhibit circuit for each of the power transistors in a push-pull transistor power switching circuit, so that each transistor can be triggered on only in the presence of both a trigger signal and an indication from the inhibit circuit that the other transistor is off.

SUMMARY OF THE INVENTION

In carrying out my invention in one form I provide a circuit for selectively applying to a load a first polarity voltage through a first portion of the circuit and a second, opposite polarity voltage through a second portion of the circuit. Each portion includes semiconductor switching means which, when rendered conductive, allow application to the load of the polarity voltage associated with that portion. An input signal having relatively positive and negative voltage levels is provided for selectively activating semiconductor switching means in each portion. Each portion is also provided with semiconductor means responsive to the input signal and to the state of conduction of the semiconductor switching means in that portion for preventing the conduction of the semiconductor switching means in the other portion until the semiconductor switching means in the former portion is nonconducting.

DETAILED DESCRIPTION OF THE INVENTION

Figure 2:
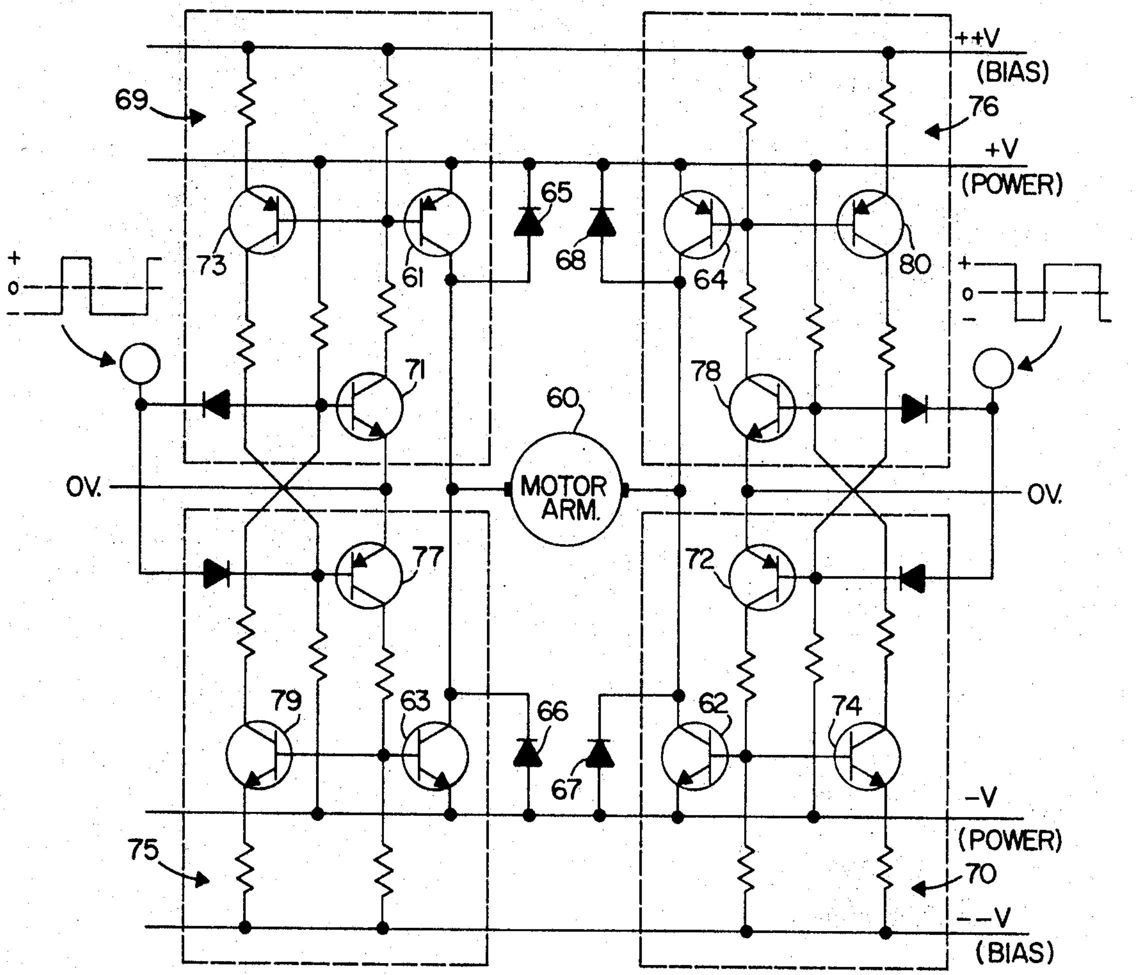

A more thorough understanding of the advantages and further objects of this invention can be obtained by referring to the following description taken in conjunction with accompanying drawings, wherein:

FIG. 1 illustrates a circuit of half-bridge configuration utilizing this invention; and FIG. 2 illustrates a circuit of full-bridge configuration utilizing this invention.

In FIG. 1, the source of voltage capable of supplying a first polarity and a second opposite polarity voltage is shown as including first, second, and third voltage supply terminals, 1, 2 and 3, respectively. The second voltage supply terminal 2 provides a voltage level intermediate that provided by the other two terminals 1 and 3. In this embodiment, the second terminal 2 is shown as a neutral and the first and third voltage supply terminals 1 and 3 are shown as having positive and negative voltage values, respectively. A load 4, having first 5 and second 6 terminals, is shown with terminal 6 connected to the second or neutral voltage supply terminal 2 and is of the type to which it is desired to selectively apply positive or negative voltages. For example, the load could be a DC motor included within a servo system wherein the direction of the motor rotation would be determined by the polarity of the applied voltage.

In order to selectively apply positive and negative voltages to the load there is provided a circuit having a first portion 7 for applying a first polarity voltage to the load and having second portion 8 for applying a second opposite polarity voltage to the load. Within the first portion, there is a semi-conductor switching means 9, and in this particular embodiment, the semiconductor switching means is a power transistor of the NPN type wherein the emitter 10 is connected to the load or motor terminal 5 and the collector 11 is connected to the first voltage supply terminal 1. To facilitate operation of the semiconductor switching means or power transistor, there is provided a driver or amplifier transistor 13. This transistor is of the PNP type having its emitter connected to the first voltage supply terminal 1 and its collector 15 connected to the base 12 of the power transistor.

It should be noted that the provision of the driver or amplifier transistor 13 in conjunction with the semiconductor switching means or power transistor is not intended to limit the scope of this invention because if the power transistor 9 had sufficient power handling and gain capability there would be no need for the driver transistor. The base 16 of the driver transistor is shown connected through a resistor 17 to a bias voltage supply terminal 18. The requirement on the bias is that it provide a more positive voltage than that provided by the first voltage supply terminal 1, which in the example shown is a positive voltage.

Within the second portion of the circuit there is a semiconductor switching means 19 in the form of a PNP power transistor having its emitter 20 connected to the load or motor terminal 5 and its collector 21 connected to the third voltage supply terminal 3. The base 22 of this power transistor is, as is the base of the power transistor included within the first portion of the circuit, connected to the collector 23 of a driver or amplifier transistor 24 which in this portion is of NPN type. As stated above, if transistor 19 had sufficient gain and power handling capability the driver transistor 24 would be unnecessary. The emitter 25 of the driver transistor is connected to the third voltage supply terminal 3, and its base 26 is connected through a resistor 27 to a source of bias voltage 28. The requirement on the bias is that it provide a more negative voltage than that provided by the third voltage supply terminal 3 which is a negative voltage.

In order to selectively activate the semiconductor switching means included within each portion of the circuit and to control the operation of the elements of the circuit which comprise this invention, means 29 provides an input signal 30 having relatively positive and negative voltage levels which is applied to terminal 31. In a servo system, for example, means 29 could include a conventional error signal generator combined with a modulator. The input signal would be obtained by the modulation of a separately generated, triangular-shaped signal with the low frequency output signal of the error generator. Such a signal would be termed a time-modulated signal.

FIG. 1 also shows first and second amplifiers, 32 and 33 for respectively controlling the transistor driver amplifiers 13 and 24. The first amplifier 32 is an NPN type transistor having its base 34 connected through a diode 35 to the input terminal 31. The base is also connected to the first voltage supply terminal 1 through a resistor 36. The collector 37 of this transistor amplifier is connected to the base 16 of the driver amplifier, but it is to be understood that intermediate stages of amplification could be provided between this transistor amplifier and the driver without departing from the scope of this invention. The emitter 38 of this transistor amplifier is connected to the intermediate voltage supply terminal 2. The second transistor amplifier 33 is of the PNP type and has its base 39 connected through a diode 40 to the terminal 31. The base is also connected through a resistor 41 to the third voltage supply terminal 3. The collector 42 of this transistor amplifier is connected to the base 26 of the driver amplifier but, as stated above, intermediate stage of amplification could be provided.

In accordance with the invention, there is provided semiconductor means 43 in the first portion of the circuit for sensing the conduction of the semiconductor switching means 9 in the first portion to prevent conduction of the semiconductor switching means 19 in the second portion until the semiconductor switching means in the first portion is nonconducting. The semiconductor means 43 comprises a transistor of the PNP type having its emitter 44 connected through a diode 45 to the first voltage supply terminal 1 and through a resistor 46 to the first bias supply terminal 18. The base 47 of this transistor is connected to the base 16 of the driver transistor 13 included within the first portion so as to sense the conduction of the semiconductor switching means. The base 47 of this transistor is also connected to the collector 37 of the transistor amplifier 32 and to the bias supply terminal 18 through the resistor 17. The collector 48 of this transistor is connected through a resistor 49 to the base 39 of the transistor amplifier 33 included within the second portion of the circuit which is responsive to the input signal.

Also, in accordance with this invention, semiconductor means 50 is provided in the second portion of the circuit for sensing the conduction of the semiconductor switching means 19 included in a second portion to prevent the conduction of the semiconductor switching means included in the first portion until the semiconductor switching means in the second portion is nonconducting. The semiconductor means 50 comprises a transistor of the NPN type having its base 51 connected to the base 26 of the driver amplifier transistor so as to sense the conduction of the semiconductor switching means included in the second portion. The base 51 is also connected to the collector 42 of transistor amplifier 33 and to the bias supply terminal 28 through the resistor 27. The emitter 52 of this transistor is connected through a diode 53 to the third voltage supply terminal 3 and through a resistor 54 to the second bias supply terminal. The collector 55 of this transistor is connected through a resistor 56 to the base 34 of the transistor amplifier included within the first portion of the circuit which is responsive to the input signal.

The operation of the circuit may be understood by assuming that the negative voltage level of the input signal is first applied to terminal 31. This voltage level, as will be evident, causes the second portion 8 of the circuit to be operable so as to apply one polarity, in this case negative, voltage across the load. The base terminal of the transistor amplifier 33 in the second portion is held at a negative voltage level through the resistor 41, and since the emitter terminal is at a relatively positive voltage level the base-emitter junction of this transistor is properly biased for conduction. The fact that the transistor amplifier 33 is turned on overcomes the effect of the negative bias voltage applied to the base of the driver transistor 24 and brings the voltage level at that base to a level more positive than that supplied by the third voltage supply terminal 3 so as to forward bias the base-emitter junction of this transistor. The conduction of the driver transistor 24 causes the voltage level at the base of power transistor 19 to be more negative than that of the load terminal so as to forward bias the power transistor. Conduction of the power transistor results in the negative polarity voltage being supplied to the load. The emitter of the transistor 50, being connected through the resistor 54 to the bias supply terminal 28, is held at a relatively more negative voltage level than the base, the voltage level of which is held near that of the second voltage supply terminal 2 due to the conduction of the transistor amplifier 33. The transistor 50 is thus turned on because the base-emitter junction is forward biased.

The conduction of the transistor 50 together with the presence of the diode 35 keeps the base terminal of the transistor amplifier 32 in the first portion at a voltage level more negative than that of the second voltage supply terminal 2. This transistor is nonconducting because its base-emitter junction is reversed biased. The driver amplifier 13 in the first portion is biased off because the voltage level at the base is relatively more positive than that at the emitter due to the resistor 17 being connected to the source of bias voltage 18 and due to the transistor amplifier 32 being nonconductive. With driver amplifier 13 biased off the power transistor 9 included in the first portion is also biased off because its base is not held at a positive enough voltage level to forward bias the base-emitter junction. The transistor 43 included within the first portion is nonconducting because its base 47 is held at a positive voltage level higher than the voltage level at the emitter, and this effect cannot be overcome because the transistor amplifier 32 is turned off.

Transistor amplifier 32 is thus the controlling element in the inhibit circuit described. This transistor acts as an AND gate in that it can conduct only when the input source signal is positive and transistor 50 is not conducting.

The second or opposite polarity voltage will be applied to the load after the input signal changes to its other, in this case, positive voltage level. When this change in the input signal occurs, the transistor amplifier 33 is immediately turned off because the diode 40 conducts and the positive voltage level of the input signal is applied to the base to reverse bias the base-emitter junction. If the transistor amplifier 32 in the first portion were immediately turned on and the driver 13 and power 9 transistors in the first portion were likewise immediately turned on before the driver 24 and power 19 transistors in the second portion were turned off, an undesirable current could flow through the driver and power transistors in both portions bypassing the load and causing excessive dissipation in these transistors.

In accordance with the invention, the transistor amplifier 32 is not immediately turned on. Since the positive voltage level of the input signal causes the diode 35 to be non-conductive, and because the base of the transistor amplifier 32 is connected by resistor 36 to a positive voltage of magnitude greater than that applied to the emitter transistor amplifier 32 is enabled for conduction. However, the base of this transistor is also connected to the transistor 50 included in the second portion which, as long as it remains conducting, biases off the transistor amplifier 32. Transistor 50 will turn off and thus allow the transistor amplifier 32 to turn on only after two conditions are satisfied. First, the input signal must turn off the transistor amplifier 33 included in the second portion, as previously mentioned. Second, the driver transistor 24 included within the second portion must be nonconducting which occurs after an interval of time determined by the storage and fall times of the transistor amplifier 33, any intermediate transistors, and the driver transistor 24. The transistor 50 in the second portion is then turned off because the base, through the resistor 27, is held at a more negative voltage than the emitter, and this bias is no longer overcome by the conduction of the driver transistor 24 which serves to clamp the base 51 of transistor 50 to the more positive voltage on bus 3 than the level of the voltage at the emitter. The transistor 50 is thus responsive to the conduction of driver transistor 24 which is in turn indicative of the state of conduction of power transistor 19.

The transistor amplifier 32 is then turned on, but only after the driver 24 and power 19 transistors in the second portion are nonconducting. The driver 13 and power 9 transistors in the first portion are then turned on so as to apply the opposite or positive polarity voltage to the load. This polarity voltage will be applied to the load until the voltage level of the input signal again changes to initiate a similar sequence of operations.

The operation of the circuit may be summarized by saying that the switching on of an oncoming portion is held up until the outgoing portion is fully cleared. The invention provides an actual case sensing of the conduction of switching devices included within each portion. The sensing is across the emitter-base junction of the switch that applies the voltage to the load. This is a unique point for sensing since the emitter-base junction (voltage) indicates not only the steady state operation of the transistor but also the switching transient condition, i.e. the storage and fall periods of turnoff. Thus, the emitter-base indication of nonconduction is absolute. The operation of this circuit is a function of the speed of the particular transistors in the respective stages, and the action follows any change in parameters from device and with temperature. No adjustments or sizing of components for worst case conditions are necessary.

In FIG. 2 a full bridge circuit configuration of the invention is shown. The part of the circuit to the left of the load or motor 60 is similar to that of FIG. 1 with the exception that the semiconductor switching means 61, 62, 63, 64 within each portion comprises a single power transistor. Diodes 65, 66, 67, and 68 have been added to provide a path for the inductive current after a switching transition but are not considered pertinent to those elements of the circuit which comprise the invention. The part of the circuit to the right of the motor is a mirror image of that part to the left thereof. It should be noted that the input signal applied to the left-hand part of the circuit is first inverted before being simultaneously applied to the right-hand part.

This full bridge configuration circuit can be viewed as having a first portion 69, 70 including semiconductor switching means in the form of first and second power transistors, 61 and 62 respectively, first and second transistor amplifiers, 71 and 72 respectively, and first and second semiconductor means, 73 and 74 respectively, and a second portion 75, 76 including semiconductor switching means in the form of third and fourth power transistors 63 and 64 respectively, third and fourth transistor amplifiers, 77 and 78 respectively, and third and fourth semiconductor means 79 and 80 respectively. When the input signal applied to the left-hand part of the circuit is at a positive voltage level, transistor 61 conducts and transistor 62 also conducts in response to the inverted input signal being simultaneously applied to the right-hand part of the circuit. The first portion 69, 70 thus applies a first polarity voltage to the load through transistors 61, 62. When the input signal applied to the left-hand part of the circuit is at a negative voltage level, transistor 63 conducts and transistor 64 also conducts in response to the inverted input signal being simultaneously applied to the right-hand part of the circuit. The second portion 75, 76 thus applies a second, opposite polarity voltage to the load through transistors 63, 64. When the first portion 69, 70 is operative, semiconductor means comprising first and second transistors 73 and 74, respectively, sense the conduction of semiconductor switching means comprising first and second power transistors 61 and 62 respectively, and prevent the turning of semiconductor switching means comprising third and fourth power transistors 63 and 64 respectively, in the second portion until semiconductor switching means 61, 62 are nonconducting. Similarly, when the second portion 75, 76 is operative, semiconductor means comprising third and fourth transistors 79 and 80 respectively, sense the conduction of semiconductor switching means comprising third and fourth power transistors 63 and 64 respectively, and prevent the turning on of semiconductor switching means comprising first and second power transistors 61 and 62 respectively, in the first stage until semiconductor switching means comprising third and fourth power transistors 63, 64 are nonconducting.

What I claim as new and desire to secure by Letters Patent of the United States is:

1. In a circuit for alternately supplying opposite polarity voltage from separate sources of voltages to a load by means of first and second switches controlled by a signal source, means for inhibiting current flow between said sources through said switches comprising, an inhibit circuit coupled to the input of each of said first and second switches and responsive to a state of conduction of the conducting switch for applying an inhibit signal to the nonconducting switch to inhibit the turn-on of the nonconducting switch until the conducting switch has turned off.

2. The circuit recited in claim 1 wherein said first and second switches are transistors and said inhibit circuit includes:

individual sensing means coupled across the emitter-base junction of an associated one of said transistors, means for coupling the output of each sensing means to a control portion of the input of the transistor associated with the other sensing means to prevent conduction of the nonconducting transistor until the signal from the sensing means for the conducting transistor indicates the conducting transistor has turned off.

3. The circuit recited in claim 2 wherein each control portion is responsive to said input signal and functions as an AND gate to prevent turn-on of the nonconducting transistor until both the appropriate input signal and a signal from the sensing means for the conducting transistor indicating that the conducting transistor has turned off are received by the the control portion of the nonconducting transistor.

4. In a circuit for alternately supplying opposite polarity voltage to a load comprising first and second transistors controlled by an input signal source, a circuit for permitting conduction of the nonconducting transistors only when conduction of the conducting transistors has ceased, comprising:

first sensing means coupled across the emitter-base junction of said first transistors, second sensing means coupled across the emitter-base junction of said second transistors, first AND gate means coupled to said first transistors, second AND gate means coupled to said second transistors, said first AND gate means permitting conduction of said first transistors in the presence of an appropriate input signal and a signal from said second sensing means indicating that said second transistors are not conducting, and said second AND gate means permitting conduction of said second transistors in the presence of an appropriate input signal and a signal from said first sensing means indicating that said first transistors are not conducting.

References Cited

UNITED STATES PATENTS

| | | | |
|---|---|---|---|
| 3,223,855 | 12/1965 | Emerson et al. | 307—218 XR |
| 3,406,309 | 10/1968 | Martens | 318—20.835 |
| 3,427,520 | 2/1969 | Oppedahl | 318—20.835 |

STANLEY T. KRAWCZEWICZ, Primary Examiner

U.S. Cl. X.R.

307—218, 236, 313; 318—18, 345; 328—94, 97, 140